United States Patent
Inda

(10) Patent No.: US 9,580,320 B2
(45) Date of Patent: Feb. 28, 2017

(54) LITHIUM ION CONDUCTIVE SOLID ELECTROLYTE AND METHOD FOR MANUFACTURING THE SAME

(75) Inventor: Yasushi Inda, Samihara (JP)

(73) Assignee: OHARA INC., Sagamihara-shi (JP)

( * ) Notice: Subject to any disclaimer, the term of this patent is extended or adjusted under 35 U.S.C. 154(b) by 2017 days.

(21) Appl. No.: 11/453,919

(22) Filed: Jun. 16, 2006

(65) Prior Publication Data

US 2007/0087269 A1     Apr. 19, 2007

(30) Foreign Application Priority Data

Oct. 13, 2005  (JP) ................. 2005-298728

(51) Int. Cl.
  *C01B 25/45*  (2006.01)
  *H01M 6/18*  (2006.01)
  *H01M 10/0562*  (2010.01)

(52) U.S. Cl.
  CPC ............. *C01B 25/45* (2013.01); *H01M 6/185* (2013.01); *H01M 6/186* (2013.01); *H01M 6/188* (2013.01); *H01M 10/0562* (2013.01); *H01M 2300/0068* (2013.01)

(58) Field of Classification Search
  USPC ........................................ 429/322
  See application file for complete search history.

(56) References Cited

U.S. PATENT DOCUMENTS

| | | | |
|---|---|---|---|
| 3,901,733 A * | 8/1975 | Toy et al. ............... | 429/320 |
| 4,042,482 A | 8/1977 | Shannon et al. | |
| 4,957,673 A * | 9/1990 | Schroeder et al. ......... | 264/643 |
| 5,292,693 A * | 3/1994 | Kaga et al. ............ | 501/103 |
| 5,882,455 A * | 3/1999 | Bezama et al. ......... | 156/89.23 |
| 6,200,707 B1 | 3/2001 | Takada et al. | |
| 6,315,881 B1 | 11/2001 | Fu | |
| 6,797,436 B2 * | 9/2004 | Takizawa et al. ......... | 429/303 |
| 2004/0111874 A1 * | 6/2004 | Schierle-Arndt et al. ... | 29/623.1 |

FOREIGN PATENT DOCUMENTS

| | | | | |
|---|---|---|---|---|
| EP | 1424743 A1 * | 6/2004 | ............ | H01M 10/36 |
| EP | 1 760 819 A2 | 3/2007 | | |
| JP | 59081872 A * | 5/1984 | ............ | H01M 6/18 |
| JP | 05-254918 | 10/1993 | | |
| JP | 05004868 A * | 1/1994 | ............ | C04B 35/48 |
| JP | 2000-026135 A | 1/2000 | | |
| JP | 2000-331684 | 11/2000 | | |
| JP | 2001-043892 A | 2/2001 | | |
| JP | 2001-093536 | 4/2001 | | |
| JP | 2001-210360 | 8/2001 | | |
| JP | 2001-243984 | 9/2001 | | |
| JP | 2003-242958 | 8/2003 | | |

OTHER PUBLICATIONS

Aono et al("Ionic Conductivity of Solid Electrolytes based on Lithium Titanium Phosphate" Journal of the Electrochemical Society, vol. 137, No. 4, Apr. 1990, pp. 1023-1027).*

European Search Report dated Jan. 29, 2008, issued in corresponding European Patent Application No. 06120978.

Aono, H. et al.; "Ionic Conductivity of Solid Electrolytes Based on Lithium Titanium Phosphate"; Journal of the Electrochemical Society, vol. 137, No. 4, Apr. 1990, pp. 1023-1027.

Aono, H. et al.; "Electrical Properties and Sinterability for Lithium Germanium Phosphate $Li_{1+x}M_xGe_{2-x}(PO_4)_3$, M=Al, Cr, Ga, Fe, Sc, and In Systems"; Bull Chem. Soc. Jpn., vol. 65, No. 8, 1992, pp. 2200-2204.

European Office Action dated Jul. 22, 2010, issued in corresponding European Patent Application No. 06120978.9.

Notification of Reasons for Rejections, dated Jan. 7, 2014, issued in Japanese application No. 2012-142767, w/ English translation.

\* cited by examiner

Primary Examiner — Melvin C Mayes
Assistant Examiner — Michael Forrest
(74) Attorney, Agent, or Firm — Westerman, Hattori, Daniels & Adrian, LLP

(57) ABSTRACT

A solid electrolyte suitable for use in all solid type lithium ion secondary battery is made by sintering a form, particularly a greensheet, comprising at least lithium ion conductive inorganic substance powder. The solid electrolyte has porosity of 20 vol % or over.

4 Claims, No Drawings

LITHIUM ION CONDUCTIVE SOLID ELECTROLYTE AND METHOD FOR MANUFACTURING THE SAME

TECHNICAL FIELD

This invention relates to a solid electrolyte suitable for use in all solid type lithium primary battery and all solid type lithium ion secondary battery, a method for manufacturing the solid electrolyte and lithium primary battery and lithium ion secondary battery using this solid electrolyte.

BACKGROUND OF THE INVENTION

In the past, an electrolyte in which a film having micropores called a separator was impregnated with a non-aqueous electrolytic solution was generally used. A lithium ion secondary battery called a polymer battery employing a polymer electrolyte made of a polymer has recently attracted more attention than such electrolyte employing liquid.

This polymer battery uses an electrolyte made in the form of gel in which the polymer is impregnated with a liquid electrolytic solution. Since it holds a liquid electrolytic solution in the polymer, it has the advantages that there is little possibility of leakage of the liquid and, therefore, safety of the battery is improved and that it has more freedom in adopting the configuration of the battery.

Since lithium ion conductivity of such polymer electrolyte is lower than an electrolyte containing only an electrolytic solution, there has occurred a practice to reduce thickness of the polymer electrolyte. There, however, has arisen a problem in such polymer electrolyte whose thickness is reduced that, since its mechanical strength is reduced, the polymer electrolyte tends to be broken or give rise to a hole during production of the battery resulting in short-circuiting between the positive electrode and the negative electrode.

It has, therefore, been proposed, as disclosed by Japanese Patent Application Laid-open Publication No. 6-140052, to provide a solid electrolyte by adding an inorganic oxide such as alumina to the electrolyte and thereby increase its mechanical strength. As such inorganic oxide, inorganic oxides other than alumina such as silica and lithium aluminate have also been proposed.

However, the addition of such inorganic oxides such as alumina to an electrolyte causes the problem that lithium ion conductivity in the solid electrolyte is significantly reduced. Moreover, when charging and discharging are repeated in a lithium ion secondary battery employing this solid electrolyte, the electrolyte reacts with such inorganic oxide resulting in deterioration in the charging-discharging characteristic of the lithium ion secondary battery.

An all solid battery employing an inorganic solid electrolyte as an electrolyte of a lithium ion secondary battery has also been proposed. The all solid battery is superior in its safety because it does not use a combustive organic solvent such as an electrolytic solution and therefore there is no danger of leakage of liquid or combustion. In the all solid battery, however, all of its positive electrode, electrolyte and negative electrode are made of solid and, therefore, close contacts between each of these components is hard to realize and, as a result, interface resistance tends to increase. In this case, since resistance to movement of lithium ion at the interfaces between the electrodes and the electrolyte is so large that it is difficult to achieve a battery having a high output.

Further, as disclosed for example by Japanese Patent Application Laid-open Publication No. 2004-348972, there it been reported that a lithium ion secondary battery can be assembled by using an all solid electrolyte made by pelletizing solid inorganic substance such as sulfide glass by pressing. Since, however, this secondary battery has not sufficient ion conductivity to enable it to be used for practical purposes.

It is, therefore, an object of the present invention to solve the problem of difficulty in putting a solid electrolyte and a lithium ion secondary battery or a lithium primary battery using the solid electrolyte to practical uses due to low lithium ion conductivity.

It is another object of the present invention to provide a solid electrolyte and a lithium primary battery and a lithium ion secondary battery using a solid electrolyte which, notwithstanding that it does not use an electrolytic solution, has a high battery capacity and an excellent charging and discharging characteristic, can be used stably over a long period of time and is easy to manufacture and treat in production in an industrial scale.

SUMMARY OF THE INVENTION

As a result of elaborated experiments about various electrolytes used for a lithium ion secondary battery or a lithium primary battery, the inventor of the present invention has found, which has led to the present invention, that, by sintering powder of lithium ion conductive glass or crystalline (ceramics or glass-ceramics) having a specific composition, a sintered form of a desired shape having high ion conductivity can be obtained. Particularly, by preparing a greensheet from a slurry comprising powder of such glass or crystalline (ceramics or glass-ceramics) as a main component and sintering this greensheet, a sintered form which is thin and has a large area can be obtained and, by using this sintered form as an electrolyte and attaching a positive electrode and a negative electrode on either side of this electrolyte, a battery having higher output and capacity and higher charging and discharging characteristic than conventional solid electrolyte type batteries can be obtained.

In the present specification, the term "greensheet" means a thin sheet of powder of glass or crystalline (ceramics or glass-ceramics) before sintering and, more specifically, a thin sheet before sintering obtained by forming a mixed slurry comprising powder of glass or crystalline (ceramics or glass-ceramics), an organic binder, a plasticizer and a solvent to a thin sheet by means of a doctor blade or calendaring.

In the first aspect of the invention, there is provided a solid electrolyte made by sintering a form comprising at least lithium ion conductive inorganic substance powder, said solid electrolyte having porosity of 20 vol % or less.

In the second aspect of the invention, there is provided a solid electrolyte as defined in the first aspect made by sintering a greensheet comprising the lithium ion conductive inorganic substance powder.

In the third aspect of the invention, there is provided a solid electrolyte as defined in the first aspect wherein the lithium ion conductive inorganic substance powder comprises lithium, silicon, phosphorus and titanium.

In the fourth aspect of the invention, there is provided a solid electrolyte as defined in the first aspect wherein the lithium ion conductive inorganic substance powder comprises crystalline of $L_{1+x+y}(Al, Ga)_x(Ti,Ge)_{2-x}Si_yP_{3-y}O_{12}$ where $0 \leq x \leq 1$ and $0 \leq y \leq 1$.

In the fifth aspect of the invention, there is provided a solid electrolyte as defined in the fourth aspect wherein the lithium ion conductive inorganic substance powder comprises the crystalline in an amount of 50 wt % or over.

In the sixth aspect of the invention, there is provided a solid electrolyte as defined in the fourth aspect comprising the crystalline in an amount of 50 wt % or over.

In the seventh aspect of the invention, there is provided a solid electrolyte as defined in the fourth aspect wherein the crystalline is substantially free of a pore or a crystal grain boundary which obstructs ion conduction.

In the eighth aspect of the invention, there is provided a solid electrolyte as defined in the first aspect wherein the lithium ion conductive inorganic substance powder is glass-ceramics.

In the ninth aspect of the invention, there is provided a solid electrolyte as defined in the eighth aspect comprising the glass-ceramics in an amount of 80 wt % or over.

In the tenth aspect of the invention, there is provided a solid electrolyte as defined in the first aspect comprising glass-ceramics which comprises, in mol %;

| | |
|---|---|
| $Li_2O$ | 12–18% |
| $Al_2O_3 + Ga_2O_3$ | 5–10% |
| $TiO_2 + GeO_2$ | 35–45% |
| $SiO_2$ | 1–10% and |
| $P_2O_5$ | 30–40%. |

In the eleventh aspect of the invention, there is provided a solid electrolyte as defined in the first aspect wherein the lithium ion conductive inorganic substance powder is glass.

In the twelfth aspect of the invention, there is provided a solid electrolyte as defined in the first aspect having lithium ion conductivity of $1\times10^{-4}$ $Scm^{-1}$ or over.

In the thirteenth aspect of the invention, there is provided a solid electrolyte as defined in the first aspect having thickness of 200 μm or below.

In the fourteenth aspect of the invention, there is provided a lithium primary battery comprising a solid electrolyte as defined in any of the first to thirteenth aspects.

In the fifteenth aspect of the invention, there is provided a lithium ion secondary battery comprising a solid electrolyte as defined in any of the first to thirteenth aspects.

In the sixteenth aspect of the invention, there is provided a method for manufacturing a solid electrolyte comprising a step of making a form comprising lithium ion conductive inorganic substance powder as a main component and a step of sintering the form.

In the seventeenth aspect of the invention, there is provided a method as defined in the sixteenth aspect comprising a step of preparing a slurry comprising lithium ion conductive inorganic substance powder as a main component and comprising also at least an organic binder and a solvent, a step of forming the slurry to a greensheet and a step of sintering the greensheet.

In the eighteenth aspect of the invention, there is provided a method as defined in the seventeenth aspect further comprising a step of superposing a plurality of the greensheets and pressing the superposed greensheets before sintering.

In the nineteenth aspect of the invention, there is provided a method as defined in the sixteenth aspect wherein the lithium ion conductive inorganic substance powder comprises crystalline of $L_{1+x+y}(Al,Ga)_x(Ti,Ge)_{2-x}Si_yP_{3-y}O_{12}$ where $0 \leq x \leq 1$ and $0 \leq y \leq 1$.

In the twentieth aspect of the invention, there is provided a method as defined in the nineteenth aspect wherein the crystalline is substantially free of a pore or a crystal grain boundary which obstructs ion conduction.

In the twenty-first aspect of the invention, there is provided a method as defined in the sixteenth aspect wherein the lithium ion conductive inorganic substance powder is glass-ceramics.

In the twenty-second aspect of the invention, there is provided a method as defined in the sixteenth aspect wherein the lithium ion conductive inorganic substance powder is glass.

According to the invention, a solid electrolyte suitable for use in a lithium ion secondary battery and a lithium primary battery which can be used stably over a long period of time can be easily obtained because the solid electrolyte of the invention has a high battery capacity and excellent charging and discharging characteristic without using an electrolytic solution.

According to the invention, since the greensheet can be uniformly heated by forming it to a uniform thickness, sintering progresses uniformly through the greensheet and, as a result, a solid electrolyte in the form of a sheet which is very dense and has a very low porosity of 20 vol % or below can be obtained. Further, by mixing raw materials of the greensheet sufficiently, the composition of the greensheet can be made uniform and, by making the composition of the greensheet fine before sintering by means of, e.g., roll pressing or uniaxial, isotropic pressing, a solid electrolyte which is fine and has a low porosity can be obtained after sintering whereby a solid electrolyte having high ion conductivity and high output can be obtained.

Further, according to the invention, the solid electrolyte is made by sintering a greensheet comprising lithium ion conductive substance powder and this greensheet can be formed simply by means of a doctor blade, a roll coater or a die coater and also can be made by using conventional means such as kneading and extruding by adjusting the viscosity of the slurry and, accordingly, not only a solid electrolyte in the form of a sheet but also solid electrolytes of various shapes can be made simply, efficiently and cheaply.

Particularly, when a solid electrolyte in the form of a sheet is to be formed, such solid electrolyte in the form of a sheet can be obtained directly by sintering a greensheet formed to a sheet without necessity for other processing such as pressing and, therefore, a solid electrolyte in the form of a sheet having a small thickness and a large area and therefore having a high capacity and high output can be easily obtained. In the solid electrolyte of the invention, ion conductivity of $1\times10^{-4}$ $Scm^{-1}$ or over can be obtained. In a preferred embodiment from the comprehensive standpoint, ion conductivity of $5\times10^{-4}$ $Scm^{-1}$ or over can be obtained and in a more preferred embodiment, ion conductivity of $1\times10^{-3}$ $Scm^{-1}$ or over can be obtained.

DESCRIPTION OF PREFERRED EMBODIMENTS

Preferred embodiments of the invention will now be described.

The solid electrolyte of the present invention is obtained by preparing a form comprising lithium ion conductive inorganic substance powder and sintering this form. The solid electrolyte of the invention has porosity of 20 vol % or below.

If a pore exists in a solid electrolyte, there is no ion conduction path in this portion of the solid electrolyte and, as a result, ion conduction of the solid electrolyte is reduced. In case a solid electrolyte is used in a battery, the higher ion conductivity, the higher the moving speed of lithium ion and, therefore, a battery of a high output can be obtained. For this reason, porosity of a solid electrolyte should preferably be lower. In the present invention, the porosity of the solid electrolyte should preferably be 20 vol % or below, more preferably be 15 vol % or below and, most preferably, be 10 vol % or below. For making the porosity 20 vol % or below, the form to be sintered should preferably be a greensheet.

The term "porosity" in the present specification means ratio of pores per unit volume and is expressed by the following formula:

Porosity (%)=(true density−bulk density)/true density×100

True density is density of substance per se which can be measured by a method such as Archimedes Method. In contrast, bulk density is density resulting from dividing weight of substance by apparent volume and includes pores.

A greensheet comprising lithium ion conductive inorganic substance powder can be heated uniformly during sintering because the greensheet can be formed uniformly and, therefore, sintering progresses uniformly through the material and, as a result, a solid electrolyte in the form of a sheet having a very small porosity of 20 vol % or less can be produced. Therefore, variation in thickness of the greensheet before sintering should preferably be within a range from +10% to −10% relative to mean value of distribution of thickness of the greensheet before sintering. Further, by mixing materials of the greensheet sufficiently, the composition of the greensheet can be made uniform and, by making the composition of the greensheet dense before sintering by means of, e.g., roll pressing or uniaxial, isotropic pressing, a solid electrolyte which is dense and has a low porosity can be obtained after sintering whereby a solid electrolyte having high ion conductiviy and high output can be obtained. Thus, mixing of raw materials should preferably be made for at one hour or over by means of, e.g., a ball mill.

When a solid electrolyte in the form of a sheet which is a preferred embodiment of the invention is used in a battery, the thinner the sheet is, the higher is the output of the battery because moving distance of lithium ion is shorter. Further, since a broader area of an electrode per unit volume can be secured, a battery of a higher capacity can be obtained. For these reasons, thickness of the solid electrolyte used as an electrolyte layer in a battery should preferably be 200 µm or below, more preferably be 180 µm or below and, most preferably, be 150 µm or below.

Mobility of lithium ion during charging and discharging of a lithium ion secondary battery depends upon lithium ion conductivity and lithium ion transport number of the electrolyte. The solid electrolyte of the present invention, therefore, should preferably be made of a material having high lithium ion conductivity.

Ion conductivity of the lithium ion conductive crystalline should preferably be $1\times10^{-4}$ Scm$^{-1}$ or over, more preferably be $5\times10^{-4}$ Scm$^{-1}$ or over and, most preferably be $1\times10^{-3}$ Scm$^{-1}$ or over.

The lithium ion conductive inorganic substance powder used in the present invention is inorganic substance powder comprising either lithium ion conductive glass powder or lithium ion conductive crystalline powder (ceramics or glass-ceramics) or mixture thereof. For achieving high lithium ion conductivity, the lithium ion conductive inorganic substance powder should preferably comprise lithium, silicon, phosphorus and titanium as main components.

By containing a large amount of lithium ion conductive crystalline in the solid electrolyte, higher conductivity can be obtained. Therefore, the solid electrolyte should preferably have lithium ion conductive crystalline in an amount of 50 wt % or over, more preferably 55 wt % and over and, most preferably, 60 wt % or over.

By containing a large amount of lithium ion conductive crystalline also in lithium ion conductive inorganic substance powder contained in a form for producing a solid electrolyte, higher conductivity can be obtained. Therefore, the lithium ion conductive inorganic substance powder should preferably have lithium ion conductive crystalline in an amount of 50 wt % or over, more preferably 55 wt % or over and, most preferably 60 wt % or over.

As lithium ion conductive crystalline used in the present invention, a crystalline which is free of crystal grain boundary which obstructs ion conduction can be advantageously used. For example, lithium ion conductive crystalline of perovskite structure such as LiN, LISICON, $La_{0.55}Li_{0.35}TiO_3$, crystalline of NASICON structure such as $LiTi_2P_3O_{12}$ and glass-ceramics which precipitate such crystalline can be used. A preferable lithium ion conductive crystalline is $Li_{1+x+y}(Al, Ga)\times(Ti,Ge)_{2-x}Si_yP_{3-y}O_{12}$ where $0 \leq x \leq 1$ and $0 \leq y \leq 1$. Since glass-ceramics which precipitate crystalline of NASICON structure have very few pores and crystal grain boundary which obstruct ion conduction, they have high ion conductivity and chemical stability and hence are preferable.

Since a solid electrolyte containing a large amount of such glass-ceramics can achieve high ion conductivity, the solid electrolyte should preferably comprise lithium ion conductive glass-ceramics in an amount 80 wt % or over, more preferably 85 wt % or over and, most preferably 90 wt % or over.

The term "a pore or a crystal grain boundary which obstructs ion conduction" in this specification means an ion conduction obstructing factor such as a pore and a crystal grain boundary which reduces conductivity of the entire inorganic substance including lithium ion conductive crystalline to one tenths or less of conductivity the lithium ion conductive crystalline per se included in the inorganic substance.

In the present specification, "glass-ceramics" means a material which consists of an amorphous solid and crystalline and is obtained by heating a glass and thereby causing a crystal phase to precipitate in a glass phase of the glass. The glass-ceramics in the present invention includes a material in which a glass phase is completely shifted to a crystal phase on condition that the crystal phase is substantially free of pores in between crystal grains and in crystal grains, i.e., a material in which the amount of crystal (rate of crystallization) is 100 mass %. Ceramics and other sintered materials generally cannot avoid inclusion of pores and crystal grain boundary in between crystal grains and in crystal grains due to the manufacturing process of such ceramics and sintered materials and can be distinguished from glass-ceramics in this respect.

As to ion conduction, in the case of ceramics, ion conductivity of the ceramics becomes lower than ion conductivity of crystal grains constituting the ceramics due to presence of pores and crystal grain boundary in the ceramics. In the case of glass-ceramics, reduction in ion conductivity between crystal grains can be prevented by controlling the crystallization process and same ion conductivity as its crystal grains themselves can be maintained.

As a material other than glass-ceramics which is almost free of a pore or a crystal grain boundary which obstructs ion conduction, a single crystal of the above described crystalline can be cited. Since, however, such single crystal is hard to manufacture and requires a high manufacturing cost, lithium ion conductive glass-ceramics are the most preferable materials for the solid electrolyte of the present invention.

As the inorganic substance powder having a high ion conductivity contained in the solid electrolyte, powder obtained by crushing the lithium ion conductive inorganic substance comprising a lithium ion conductive crystalline or the lithium ion conductive glass-ceramics may preferably be used. Such powder should preferably be dispersed uniformly in the solid electrolyte from the standpoints of ion conductivity of the solid electrolyte and mechanical strength. For enhancing dispersion of such powder and achieving a desired thickness of the solid electrolyte, average particle diameter of the powder should preferably be 20 μm or below, more preferably 15 μm or below and, most preferably 10 μm or below.

The lithium ion conductive glass-ceramics are made by heat treating a $Li_2O$—$Al_2O_3$—$TiO_2$—$SiO_2$—$P_2O_5$ mother glass for crystallization and has a predominant crystal phase of $Li_{1+x+y}Al_xTi_{2-x}Si_yP_{3-y}O_{12}$ ($0 \leq x \leq 1$, $0 \leq y \leq 1$). From the standpoint of achieving excellent ion conductivity, x and y should preferably be $0 \leq x \leq 0.4$, $0 < y \leq 0.6$, and most preferably $0.1 \leq x \leq 0.3$, $0.1 < y \leq 0.4$.

Composition ratios expressed in mol % and results thereof of respective components constituting the lithium ion conductive glass-ceramics will now be specifically described.

$Li_2O$ is an indispensable component for providing $Li^+$ ion carrier and thereby imparting the glass-ceramics with lithium ion conductivity. For achieving an excellent ion conductivity, the lower limit of the amount of this component should preferably be 12%, more preferably be 13% and, most preferably be 14%. The upper limit of the amount of this component should preferably be 18%, more preferably be 17% and, most preferably be 16%.

$Al_2O_3$ is effective for improving thermal stability of the mother glass and also for providing $Al^{3+}$ ion as a solid solution in the above described crystal phase and thereby improving lithium ion conductivity. For achieving these effects, the lower limit of the amount of this component should preferably be 5%, more preferably be 5.5% and, most preferably be 6%. If, however, the amount of this component exceeds 10%, thermal stability of the glass is deteriorated rather than is improved and ion conductivity of the glass-ceramics is reduced. Therefore, the upper limit of the amount of this component should preferably be 10%, more preferably be 9.5% and, most preferably be 9%.

$TiO_2$ contributes to forming of the glass and also constitutes the above described crystal phase. For causing the above described crystal phase to precipitate as a predominant crystal phase and thereby improving ion conductivity, the lower limit of the total amount of this component should preferably be 35%, more preferably be 36% and, most preferably be 37%. The upper limit of this component should preferably be 45%, more preferably be 43% and, most preferably be 42%.

$SiO_2$ is effective for improving thermal stability of the mother glass and also for providing $Si^{4+}$ ion as a solid solution in the above described crystal phase and thereby improving lithium ion conductivity. For achieving these effects sufficiently, the lower limit of the amount of this component should preferably be 1%, more preferably be 2% and, most preferably be 3%. If, however, the amount of this component exceeds 10%, ion conductivity of the glass-ceramics is reduced rather than is improved. Therefore, the upper limit of the amount of this component should preferably be 10%, more preferably be 8% and, most preferably be 7%.

$P_2O_5$ is an indispensable component as a glass former and also is a component which constitutes the above described crystal phase. If the amount of this component is less than 30%, difficulty arises in vitrification. Therefore, the lower limit of the amount of this component should preferably be 30%, more preferably be 32% and, most preferably be 33%. If the amount of this component exceeds 40%, difficulty arises in the precipitation of the above described crystal phase in the glass. Therefore, the upper limit of the amount of this component should preferably be 40%, more preferably be 39% and, most preferably be 38%.

In the above described composition, a glass can be easily obtained by casting molten glass and glass-ceramics obtained by heat treating this glass have the above described crystal phase and exhibit an excellent lithium ion conductivity.

Aside from the above described composition, in glass-ceramics having a crystal structure similar to the one described above, $Al_2O_3$ can be replaced by $Ga_2O_3$ partly or in whole and $TiO_2$ can be replaced by $GeO_2$ partly or in whole. In the manufacture of the glass-ceramics, other materials may be added in small amounts for lowering the melting point or improving stability of the glass within a range not to deteriorate ion conductivity.

The glass-ceramics composition should preferably not contain $Na_2O$ or $K_2O$, i.e., alkali metal oxides other than $Li_2O$. When these alkali metal oxides are present in the glass-ceramics, conduction of Li ion is obstructed due to an effect caused by mixing of alkali ions whereby ion conductivity is reduced.

Addition of sulfur to the glass-ceramics composition improves lithium ion conductivity to a small degree but it deteriorates chemical durability and chemical stability and, therefore sulfur should preferably not be contained.

The glass-ceramics composition should preferably not contain Pb, As, Cd or Hg which tends to cause adverse effects to the environment and human body.

For preparing a greensheet, lithium ion conductive inorganic substance powder, i.e., powder of glass or crystalline (ceramics or glass-ceramics) having high lithium ion conductivity and chemical stability, or mixture thereof is mixed with an organic binder and, if necessary, a dispersant etc. by using a solvent. The mixture is then formed to a greensheet by a simple method such as a method using a doctor blade. The greensheet thus prepared is processed to a desired shape and then preferably is pressed by roll pressing or uniaxial, isotropic pressing and thereafter is sintered to remove an organic component of the organic binder. Thus, an all solid electrolyte in the form of a thin sheet or any other desired shape can be produced.

As the organic binder used for preparing a greensheet, a commercially available binder used as an additive in using a doctor blade can be used. Additives used in other processes than a doctor blade, e.g., rubber press and extruding, can also be used as the binder. More specifically, acrylic resin, ethyl cellulose, polyvinyl butyral, methacrylate resin, urethane resin, butyl methacrylate and vinyl copolymers, for example, may be used. In addition to such binder, other additives such as a dispersant for improving dispersion of particles of the materials and surfactants for improving defoaming during a drying process may be added in a proper amounts.

For improving electron conductivity without deteriorating lithium ion conductivity, other inorganic substance powder or organic substance may also be added. As such inorganic substance powder, a small amount of insulating crystalline or glass having high dielectric capacity may be added. These insulating crystalline or glass includes, for example, $BaTiO_3$, $SrTiO_3$, $Nb_2O_5$ and $LaTiO_3$.

Since organic substance is removed during sintering, such organic substance may be used for, for example, for adjusting viscosity of the slurry during forming.

For forming the greensheet, simple conventional means such as doctor blade, roll coater and die coater may be used. If viscosity of the greensheet is adjusted, conventional machines used for kneading and extruding may also be used. Thus, solid electrolytes of various shapes can be manufactured efficiently and cheaply.

By coating a positive electrode and a negative electrode on either side of the sheet obtained in the above described manner, and drying or sintering the sheet, a lithium ion secondary battery can be provided.

The solid electrolyte in the form of a sheet obtained by sintering has the same shape as the shape of the greensheet formed and, therefore, processing to any desired shape is easy and manufacture of a solid electrolyte having the shape of a thin film or any other desired shape and a lithium ion secondary battery using this solid electrolyte can be easily realized.

Since the solid electrolyte after sintering does not contain an organic substance, it has excellent heat resisting property and chemical durability and, moreover, is not likely to cause an adverse effect to the environment and human body.

As the active material used for a positive electrode material of the lithium ion secondary battery and a lithium primary battery of the invention, a transition metal compound which can store and discharge lithium may be used. For example, at least one transition metal compound selected from the group consisting of manganese, cobalt, nickel, vanadium, niobium, molybdenum, titanium, iron and phosphorus may be used. Since most active materials scarcely have electron conductivity and ion conductivity, an electron conduction additive and an ion conduction additive should preferably be used. Such electron conduction additives include, for example, conductive carbon, graphite, carbon fiber, metal powder, metal fiber and electron conductive polymer. Such ion conduction additives include, for example, an ion conductive glass-ceramics and an ion conductive polymer. These electron and ion conduction additives should preferably be added in an amount within a range from 3-35 mass %, more preferably 4-30 mass % and, most preferably, 5-25 mass %, to the positive electrode active material.

As the active material used for a negative electrode material of the lithium ion secondary battery and the lithium primary battery of the invention, metal lithium, alloys which can store and discharge lithium such as a lithium-aluminum alloy, and a lithium-indium alloy, transition metal compounds such as titanium and vanadium, and carbon type materials such as graphite may preferably be used. As an electron conduction additive used when the active material has not sufficient electron conductivity, for example, conductive carbon, graphite, carbon fiber, metal powder, metal fiber and electron conductive polymer may be preferably used. As an ion conduction additive, for example, an ion conductive glass-ceramics, and an ion conductive polymer may preferably be used. These electron and ion conduction additives should preferably be added in an amount within a range from 3-35 mass %, more preferably 4-30 mass % and, most preferably, 5-25 mass %, to the negative electrode active material.

It is preferable that ion conductive glass-ceramics added to the positive and negative electrodes are the same glass-ceramics that are contained in the solid electrolyte. When these glass-ceramics are the same, the ion moving mechanism of the electrolyte becomes the same as the ion moving mechanism of the electrodes and moving of ion between the electrolyte and the electrodes thereby becomes smooth with the result that a battery of higher output and capacity can be provided.

EXAMPLES

Description will now be made about specific examples of the solid electrolyte of the present invention and the lithium ion secondary battery and lithium primary battery using this solid electrolyte.

The present invention, however, is not limited to these examples but modifications may be made within the spirit and scope of the present invention.

Example 1

Raw materials of $H_3PO_4$, $Al(PO_3)_3$, $Li_2CO_3$, $SiO_2$ and $TiO_2$ were weighed and mixed uniformly to make a composition of 35.0% $P_2O_5$, 7.5% $Al_2O_3$, 15.0% $Li_2O$, 38.0% $TiO_2$ and 4.5% $SiO_2$ expressed in mol % on oxide basis. The mixture was put in a platinum pot and heated and melted in an electric furnace at 1500° C. for three hours, while the glass melt was stirred. Then, the glass melt was dropped into flowing water to produce glass in the form of flakes. This glass was subjected to crystallization by heat treatment at 950° C. for twelve hours to produce target glass-ceramics. The predominant crystal phase precipitating in the glass-ceramics was confirmed to be $Li_{1+x+y}Al_xTi_{2-x}Si_yP_{3-y}O_{12}$ where $0 \leq x \leq 0.4$ and $0 < y \leq 0.6$ by the powder X-ray diffraction. The flakes of the glass-ceramics were milled by a jet mill and glass-ceramics powder having an average particle diameter of 5 µm and a maximum particle diameter of 20 µm was obtained.

To this lithium ion conductive glass-ceramics powder and water were added and dispersed urethane resin by adding also a dispersant and these components were mixed to prepare a slurry. The slurry was formed by using a doctor blade to a sheet having thickness of 200 µm and this sheet was dried at 90° C. to provide a greensheet. This greensheet was cut into cubes having length of 50 mm and sintered at 1000° C. to produce a solid electrolyte in the form of a sheet having thickness of 120 µm. The solid electrolyte had ion conductivity of $1.5 \times 10^{-4}$ $Scm^{-1}$. The porosity of the solid electrolyte measured on the basis of true density and bulk density was 16 vol %.

Comparative Example 1

Glass-ceramics which are the same as those of Example 1 were put in a mold for uniaxial press molding having a diameter of 40 mm and was formed to a pellet having thickness of 5 mm by pressing the glass-ceramics at 2$t$. This form was sintered at 1000° C. for five hours. Ion conductivity of this pellet was $3.1 \times 10^{-5}$ $Scm^{-1}$ and porosity thereof was 21 vol %.

Example 2

Glass-ceramics which were the same as those of Example 1 were milled by using a ball mill to particles each having an average particle diameter of 1 µm and a maximum particle diameter of 8 µm. The glass-ceramics were mixed and dispersed with acrylic resin and a dispersant by using water as a solvent to prepare a slurry. The mixture was formed by a roll coater and then dried to form a greensheet having thickness of 100 μm. This greensheet was pressed by a roll press to make it fine and was sintered at 1050° C. to provide a solid electrolyte having thickness of 75 μm. This solid electrolyte had ion conductivity of $3\times10^{-4}$ Scm$^{-1}$ and porosity of 7 vol %. By making the texture of the solid electrolyte fine by pressing the greensheet by the roll press, porosity was reduced to less than half of the solid electrolyte of Example 1 and a solid electrolyte having high conductivity was obtained.

Example 3

The glass before being subjected to crystallization which was obtained in the processing of Example 1 was milled by a ball mill to glass particles having an average diameter of 2 μm and a maximum particle diameter of 10 μm. The glass particles were mixed and dispersed with urethane resin and a dispersant by using water as a solvent to prepare a slurry. The mixture was formed by a roll coater and then dried to form a greensheet having thickness of 100 μm. This greensheet was made fine by using CIP and sintered at 1050° C. to provide a solid electrolyte having thickness of 80 μm. This solid electrolyte had ion conductivity of $4\times10^{-4}$ Scm$^{-1}$ and porosity of 5 vol %.

Example 4

The lithium ion conductive glass-ceramics powder having an average particle diameter of 1 μm obtained by Example 2 and the glass before crystallization obtained by Example 1 which was milled to glass particles each having an average particle diameter of 0.5 μm were mixed at a ratio of 9:1 (=glass-ceramics:glass) and dispersed with acrylic resin and a dispersant by using water as a solvent to prepare a slurry. The mixture was formed by a roll coater and then dried to form a greensheet having thickness of 120 μm. This greensheet was pressed by a roll press to make it fine and was sintered at 1050° C. to provide a solid electrolyte having thickness of 90 μm. This solid electrolyte had ion conductivity of $4\times10^{-4}$ Scm$^{-1}$ and porosity of 8.5 vol %.

Example 5

On one side of the solid electrolyte obtained by Example 1 was coated a slurry comprising $Li_4Ti_5O_{12}$ as an active material and lithium ion conductive glass-ceramics having an average particle diameter of 0.3 μm as an ion conduction additive. This slurry was dried and sintered to constitute a positive electrode. This positive electrode had thickness of 13 μm. Al was sputtered on this positive electrode to constitute a positive electrode collector.

On the other side of the solid electrolyte was thinly coated a slurry in which a copolymer of polyethylene oxide added with LiTFSI as a lithium salt and polypropylene oxide was solved in THF solution. This slurry was dried. Then, Li metal foil having thickness of 0.1 mm was attached onto the dried copolymer to constitute a negative electrode. The coated copolymer had thickness of 4 μm. Lead wires were attached to the positive electrode and the negative electrode to assemble a lithium ion secondary battery.

The assembled lithium ion secondary battery could be driven at an average discharging voltage of 1.5 V.

Example 6

By using the solid electrolyte of Example 2, a lithium ion secondary battery was assembled in the same manner as in Example 5. This secondary battery could be driven at an average discharging voltage of 1.5 V.

Example 7

By using the solid electrolyte of Example 3, a lithium ion secondary battery was assembled in the same manner as in Example 5. This secondary battery could be driven at an average discharging voltage of 1.5 V.

Example 8

By using the solid electrolyte of Example 4, a lithium ion secondary battery was assembled in the same manner as in Example 5. This secondary battery could be driven at an average discharging voltage of 1.5 V.

Example 9

The lithium ion conductive glass-ceramics powder obtained by Example 1 was wet-milled by using ethanol as a solvent to provide a fine powder slurry of lithium ion conductive glass-ceramics having an average particle diameter of 0.2 μm and a maximum particle diameter of 0.3 μm. The slurry was mixed and dispersed with a vinyl copolymer and urethane resin by using water as a solvent and the mixture was formed by a roll coater and then dried to provide a greensheet having thickness of 90 μm. This greensheet was stamped out in the form of a disk having a diameter of 20 mm and the stamped out disk was pressed by a hand press and then sintered at 1000° C. to provide a disk-form solid electrolyte having thickness of 50 μm. On one side of the solid electrolyte was coated a slurry comprising $LiCoO_2$ as an active material and fine powder slurry of lithium ion conductive glass-ceramics which was the same as the glass-ceramics used for the solid electrolyte as an ion conduction additive and this slurry was dried and sintered to constitute a positive electrode. Al was sputtered on this positive electrode to constitute a positive electrode collector.

On the other side of the solid electrolyte was coated a slurry comprising $Li_4Ti_5O_{12}$ as an active material and fine powder slurry of lithium ion conductive glass-ceramics which was the same as the glass-ceramics used for the solid electrolyte as an ion conduction additive and this slurry was dried and sintered to constitute a negative electrode. Paste comprising cupper fine powder was coated on this negative electrode and dried and sintered to constitute a negative electrode collector. The laminate was then sealed in a coin cell and a lithium ion secondary battery thereby was assembled. It was confirmed that this battery could be performed at an average discharging voltage of 3 v.

Example 10

A lithium primary battery was prepared in the following manner.

The glass-ceramics obtained in Example 1 were milled by a ball mill and milled particles were classified to provide glass-ceramics powder having an average particle diameter of 1 μm and a maximum particle diameter of 5 μm. The glass-ceramics powder was mixed and dispersed with acrylic resin and a dispersant by using water as a solvent and the mixture was formed by a roll coater and dried to provide a greensheet having thickness of 140 μm. This greensheet was pressed to make it fine and was sintered at 1075° C. to provide a solid electrolyte having thickness of 100 μm. This solid electrolyte had ion conductivity of $3 \times 10^{-4}$ Scm$^{-1}$.

A positive electrode compound was prepared by using commercially available MnO$_2$ as a positive electrode active material, acetylene black as an electron conduction additive, and PVdF (polyvinylidene fluoride) as a binder. These materials were mixed and formed by a roll press to a sheet having thickness of 0.3 mm. The sheet was stamped out to a disk having a diameter of 18 mm to constitute a positive electrode.

The solid electrolyte was stamped out to a disk having a diameter of 20 mm. On one side of the solid electrolyte was sputtered Al and on this Al was attached a Li—Al alloy negative electrode material having a diameter of 18 mm to constitute a negative electrode. On the other side of the solid electrolyte was attached the positive electrode compound to constitute a positive electrode. The cell thus produced was put in a coin cell made of stainless steel and a mixed solvent of propylene carbonate added with 1 mol % of LiClO$_4$ as a lithium salt and 1,2-dimethoxiethane was also put in the coin cell. The coin cell was sealed to provide a lithium primary cell. In this coin cell, the solid electrolyte was fixed to the coin cell and no flexion due to change in the volume caused by discharging takes place as in the conventional separator made of resin and, as a result, very stable discharging voltage could be maintained during use of this battery.

INDUSTRIAL APPLICABILITY

The electrolyte of the present invention comprising lithium ion conductive glass-ceramics has high lithium ion conductivity and is electrochemically very stable and, therefore, it can be used not only for a lithium ion secondary battery but for a lithium primary battery, an electrochemical capacitor called a hybrid capacitor, a dye sensitized solar cell, and other electrochemical elements using lithium ion as a charge transfer carrier. Some examples of such electrochemical elements will be described below.

By attaching a desired sensitive electrode to the electrolyte, the electrolyte can be used for various gas sensors and other detectors. For example, by using carbonate as an electrode, it can be used as a carbon dioxide gas sensor. By using nitrate as an electrode, it can be used as a NO$_x$ sensor. By using sulfate as an electrode, it can be used as a SO$_x$ sensor. By assembling the electrolyte in an electrolytic cell, it can be used as an electrolyte for decomposing and catching NO$_x$ and SO$_x$ in exhaust gas.

By attaching an inorganic or organic compound which is colored or changes its color by insertion or removal of lithium ion to the electrolyte, and attaching a transparent electrode such as ITO thereto, an electrochromic device can be composed whereby an electrochromic display of a small power consumption having a memory function can be provided.

Since the ion conduction path of the electrolyte of the present invention has an optimum size for passing lithium ion, it can pass lithium ion selectively when alkali ion other than lithium ion also exists. The electrolyte therefore can be used as a partition of a lithium ion selective collection device or a partition of a lithium ion selection electrode. Since the speed of passing of lithium ion is higher as the mass of the ion is smaller, the electrolyte can be used for separating isotope of lithium ion. This enables concentration and separation of 6Li concentrate (7.42% in the ratio existing in nature) which is necessary for a blanket material for producing tritium which is a fuel of a fusion reactor.

What is claimed is:

1. A method for manufacturing a lithium ion conductive solid electrolyte comprising:
    preparing a slurry comprising lithium ion conductive glass or glass-ceramic powder as a main component and comprising also at least an organic binder and water used as a solvent,
    forming the slurry to a greensheet,
    isotropically pressing the greensheet so as to make the greensheet dense, and
    sintering the greensheet with variation in thickness of the greensheet being within a range from +10% to −10% relative to mean value of distribution of thickness of the greensheet,
    wherein the solid electrolyte has porosity of 10 vol % or less, and the solid electrolyte has thickness of 200 μm or below wherein the glass or glass-ceramic powder comprises lithium, silicon, phosphorus and titanium, and average particle diameter of the glass or glass-ceramic powder is 20 μm or below.

2. A method as defined in claim 1 further comprising a step of superposing a plurality of the greensheets and pressing the superposed greensheets before sintering.

3. A method as defined in claim 1 wherein the lithium ion conductive glass-ceramic powder comprises crystalline of $$\text{Li}_{1+x+y}(\text{Al},\text{Ga})_x(\text{Ti},\text{Ge})_{2-x}\text{Si}_y\text{P}_{3-y}\text{O}_{12} \text{ where } 0 \le x \le 1 \text{ and } 0 \le y \le 1.$$

4. A method as defined in claim 3 wherein the crystalline is free of a pore or a crystal grain boundary which obstructs ion conduction.

* * * * *